INVENTORS
JOE G. BADGER AND
ALARICO A. VALDETTARO
by
Mason, Kolehmainen, Rathburn and Wyss
ATTORNEYS.

TUNING MECHANISM FOR TELEVISION TUNERS

Filed May 14, 1965

INVENTORS
JOE G. BADGER AND
ALARICO A. VALDETTARO
by Mason, Kolehmainen,
Rathburn and Wyss
ATTORNEYS.

May 2, 1967 J. G. BADGER ET AL 3,316,770

TUNING MECHANISM FOR TELEVISION TUNERS

Filed May 14, 1965

6 Sheets-Sheet 3

INVENTORS
JOE G. BADGER AND
ALARICO A. VALDETTARO by

Mason, Kolehmainen,
Rathburn and Wyss

ATTORNEYS

May 2, 1967 J. G. BADGER ET AL. 3,316,770

TUNING MECHANISM FOR TELEVISION TUNERS

Filed May 14, 1965

6 Sheets-Sheet 4

INVENTORS
JOE G. BADGER AND
ALARICO A. VALDETTARO
by
Mason, Kolehmainen, Rathburn and Wyss.
ATTORNEYS.

INVENTORS
JOE G. BADGER AND
ALARICO A. VALDETTARO
by
Mason, Kolehmainen,
Rathburn and Wyss
ATTORNEYS.

May 2, 1967 J. G. BADGER ET AL 3,316,770

TUNING MECHANISM FOR TELEVISION TUNERS

Filed May 14, 1965 6 Sheets-Sheet 6

INVENTORS
JOE G. BADGER AND
ALARICO A. VALDETTARO
by
Mason, Kolehmainen,
Rathburn and Wyss
ATTORNEYS 3,316,770

TUNING MECHANISM FOR TELEVISION TUNERS

Joe G. Badger and Alarico A. Valdettaro, Bloomington, Ind., assignors to Sarkes Tarzian, Inc., Bloomington, Ind., a corporation of Indiana Filed May 14, 1965, Ser. No. 455,795
18 Claims. (Cl. 74—10.8)

The present invention relates to television tuners, and, more particularly, to an improved tuning mechanism for such tuners whereby a desired television channel may be accurately selected.

Various mechanical arrangements have been heretofore suggested for effecting a tuning operation in a television tuner. Certain of these arrangements have required the operator to push in a control knob and while maintaining pressure on the knob to rotate the same to adjust a fine tuning element within the tuner. While these arrangements in general have been satisfactory for their intended purpose, they have suffered from the disadvantage that the mechanism required to translate the inward push and subsequent rotation into the desired movement of the tuning element has been quite complicated and expensive to manufacture. Furthermore, these arrangements have required a relatively large force to be exerted on the control knob, which force must be maintained while the knob is rotated, thus, rendering the mechanism less readily manipulatable by some operators.

It is, therefore, an object of the present invention to provide a new and improved tuning mechanism for performing a fine tuning operation in a VHF tuner in a simple, economical and reliable manner.

It is another object of the present invention to provide a new and improved fine tuning mechanism which provides a separate fine tuning adjustment for each television channel in a simple, economical and reliable manner.

It is still another object of the present invention to provide a new and improved fine tuning mechanism for a television tuner of the type in which a control knob may be pushed in and then rotated to achieve fine tuning and wherein the pressure required to push in the control knob is minimized.

It is another object of the present invention to provide a new and improved mechanism for performing the fine tuning operation in a television tuner adapted to receive VHF signals which mechanism may be readily combined with a two-speed UHF tuning mechanism when a UHF tuner is used to receive UHF signals.

It is still another object of the present invention to provide a new and improved tuning mechanism for use with both VHF and UHF television tuners which is simple in construction, inexpensive to manufacture on a mass production basis and reliable in its operation.

The invention, both as to its organization and method of operation, together with further objects and advantages thereof, will best be understood by reference to the following detailed description, taken in conjunction with the accompanying drawings, in which.

Figure 1:
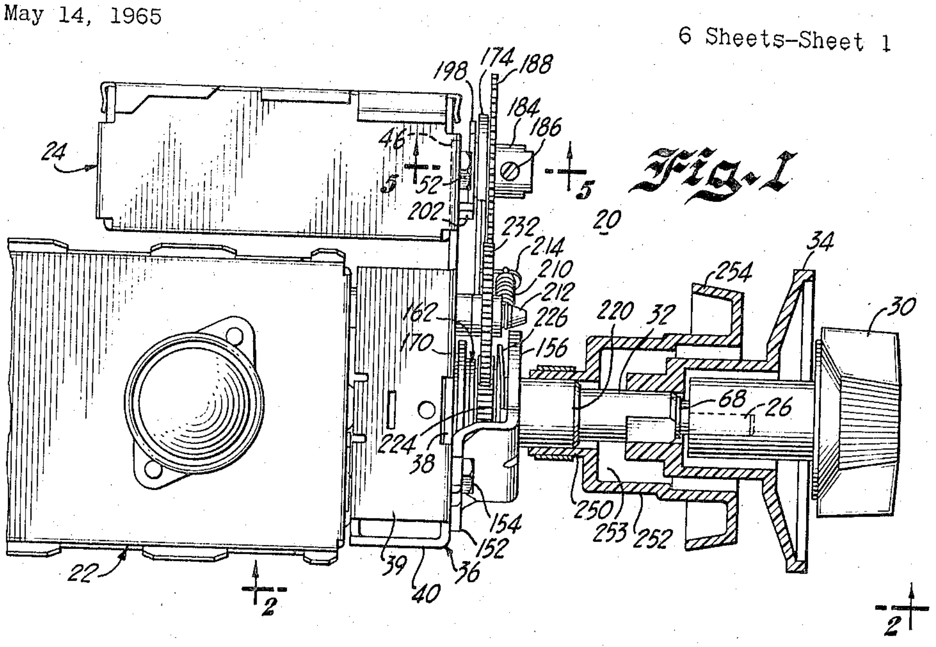
FIG. 1 is a fragmentary, top plan view of a combined VHF-UHF television tuner embodying the features of the present invention.

Referring now to the drawings, the present invention is therein illustrated as comprising a tuning mechanism indicated generally at 20 which is arranged to be secured to the front or forward end of a VHF television tuner chassis 22. The tuning mechanism 20 is arranged to provide for fine tuning of the VHF tuner 22 and is also arranged to provide both slow and fast speed tuning of a companion UHF tuner indicated generally at 24. Accordingly, the tuning mechanism 20 is shown and described in conjunction with both the VHF tuner 22 and the UHF tuner 24, it being understood, however, that the tuning mechanism of the present invention is equally applicable to provide a unique and simplified fine tuning arrangement for the VHF tuner 22 alone in the event UHF reception is not desired, as will be described in more detail hereinafter, or in the event UHF tuner is separately operated.

Figure 14:
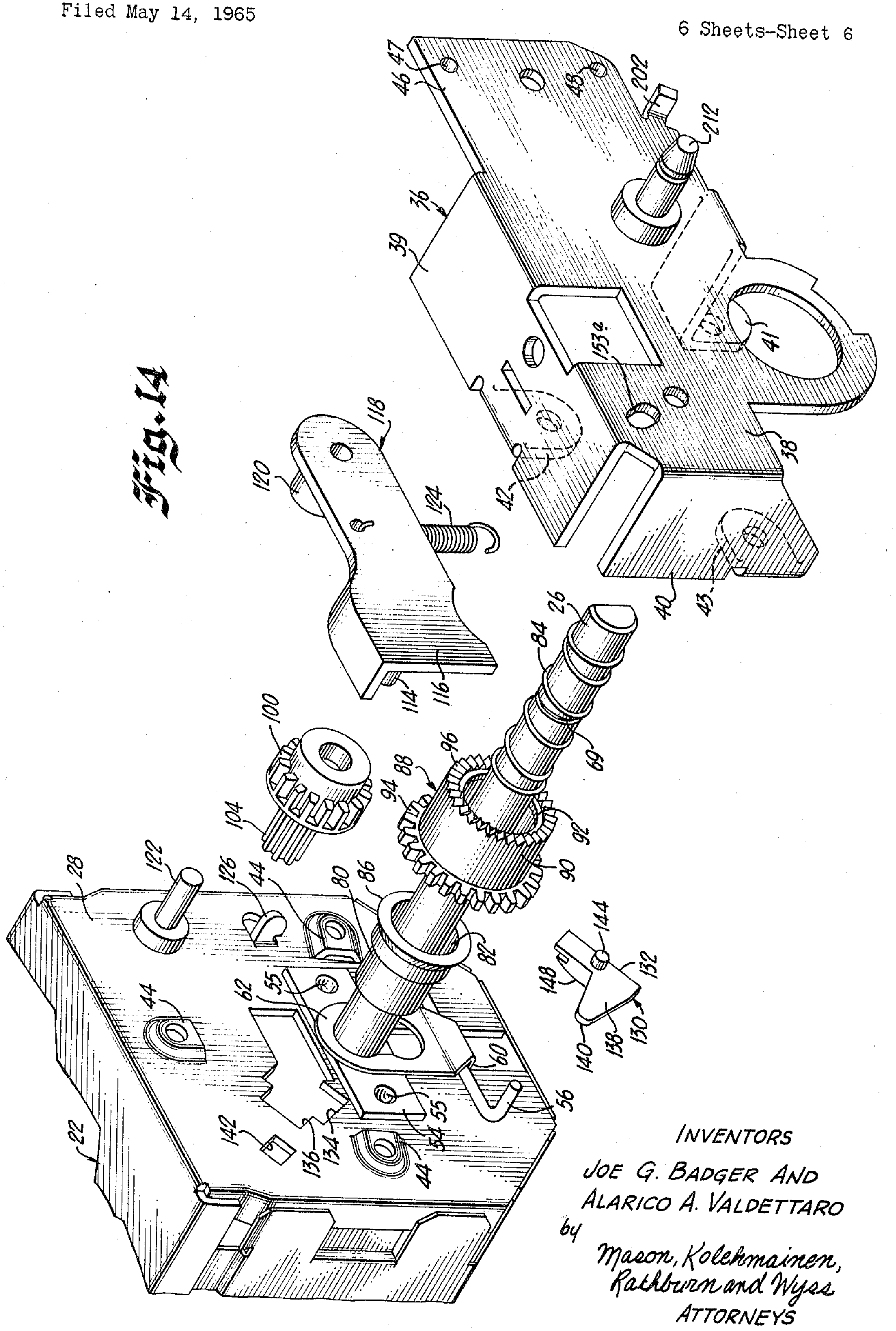
FIG. 14 is an exploded view of a portion of the fine tuning mechanism included below the main mounting bracket of FIG. 1.

The VHF tuner 22 is provided with a main station selector shaft 26 which extends forwardly from the front wall 28 (FIG. 14) of the VHF tuner 22 and is arranged to receive a station selection knob 30 on the outer end thereof, as shown in FIG. 1. A fine tuning shaft 32 is rotatably and slidably mounted on the station selector shaft 26 and is adapted to have a fine tuning knob 34 (FIG. 1) connected to the outer end thereof. The shaft 32 is normally biased to an outermost position, shown in FIG. 1, in which position adjustment of the knob 34 provides both coarse and fine tuning for the UHF tuner 24. When, the knob 34 is pushed inwardly and then rotated, a VHF fine tuning operation is performed, as will be described in more detail hereinafter.

In order to support both the UHF portion of the tuning mechanism 20 and the UHF tuner 24 on the front wall 28 of the VHF tuner 22, there is provided a main mounting bracket indicated generally at 36, this bracket comprising a front wall 38, a top wall portion 39 and a side wall portion 40. The members 38, 39, and 40 are provided with right angle offset flange portions 41, 42 and 43 which are arranged to be secured to corresponding bosses 44 (FIG. 14) formed in the front wall 28 of the VHF tuner 22 by means of the mounting screws 45 so that the bracket 36 is rigidly and securely mounted on the front end of the tuner 22. The front wall portion 38 of the bracket 36 is provided with an offset portion 46 (FIG. 3) having a pair of centering projections 47 and 48 which are adapted to be received in corresponding openings in the side wall 50 of the UHF tuner 24, the extension 46 being secured to the side walls 50 by means of the mounting screw 52.

Figures 9, 10, 11:
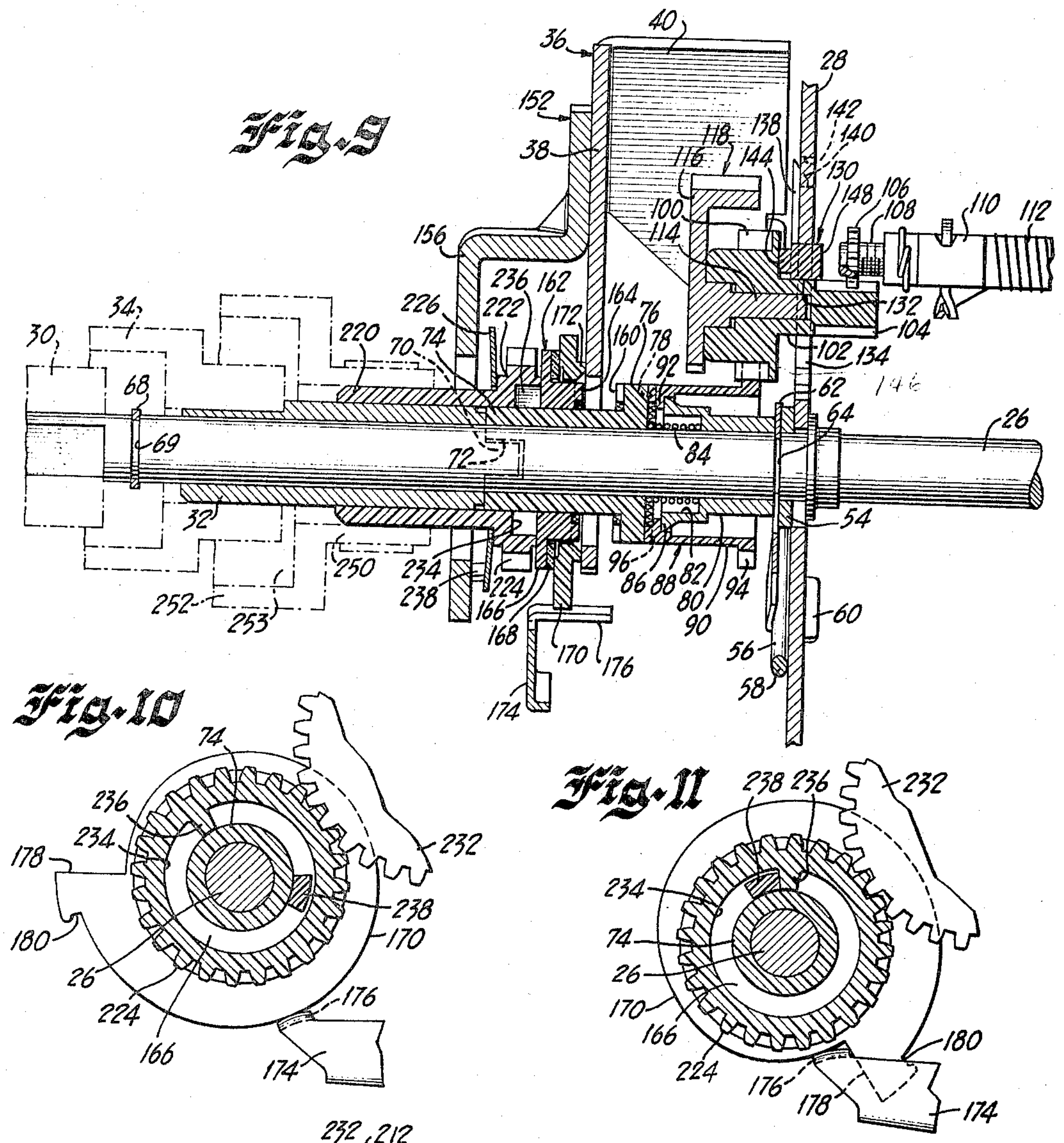
FIG. 9 is a sectional view taken along the line 9—9 of FIG. 7.
FIG. 10 is a sectional view taken along the line 10—10 of FIG. 6.
FIG. 11 is a sectional view similar to FIG. 10 but showing the parts in a different point in the fine tuning cycle.

The channel selector shaft 26 is rotatably mounted in the front wall 28 and the rear wall (not shown) of the VHF tuner 22 in any suitable manner. For example, the channel selector shaft 26 may be supported on the front wall 28 by means of a bearing strap 54 (FIG. 14) which is provided with locating projections 55 arranged to be received in corresponding openings in the front wall 28. The bearing strap 54 is provided with a suitably shaped opening for the station selector shaft 26 which provides opposed V-shaped bearing surfaces against which the shaft 26 is held by means of the right angle end portion 56 of a torsion wire retaining spring 58, the end portion 56 engaging the bottom flange 60 of an elongated, slotted retaining washer 62 the upper end of which rides in a groove 64 formed in the channel selector shaft 26 (FIG. 9). In addition to biasing the forward end of the channel selector shaft 26 into engagement with the bearing strap 54, the rear end of the torsion spring 58 may be arranged to exert a cooperating biasing force on the rear end of the shaft 26 and also provide a detent action for this shaft, as described in more detail in a copending application of Alarico A. Valdettaro, Ser. No. 63,889, filed October 20, 1960, now Patent No. 3,234,801 and assigned to the same assignee as the present invention.

Considering now in more detail the component parts of the tuning mechanism 20 and specifically the VHF fine tuning portion thereof, the fine tuning shaft 32, which may also be used as a two-speed UHF tuning shaft as described generally heretofore, is prevented from being moved forwardly along the station selector shaft 26 by means of a C-washer 68 which is positioned within a groove 69 in the channel selector shaft 26 and engages the forward end of the fine tuning shaft 32. The rear end of the tuning shaft 32 is provided with a pair of rearwardly extending tongues 70 which are adapted to mate with a corresponding pair of notches 72 (FIG. 15) provided in a tubular drive member 74 of insulating material, the member 74 being also rotatably and slidably mounted on the channel selector shaft 26. The drive member 74 is provided with a radially extending flange portion 76 at the rear end thereof, the flange portion 76 being provided with an annular series of fine teeth 78 which are positioned on the rear face of the flange 76 and project rearwardly therefrom. If desired, the member 74 may be formed integrally with the fine tuning shaft 32.

A bearing sleeve 80 is also positioned on the channel selector shaft 26 and the rear end of the sleeve 80 bears against the front surface of the elongated retaining washer 62. The forward end of the bearing sleeve 80 is provided with a central bore 82 which is adapted to receive one end of a coil spring 84, the other end of which bears against the rear end of the driving member 74. Accordingly, when no rearward force is exerted on the fine tuning shaft 32 this shaft and the members 74 and 80 are biased to the position shown in FIG. 6 by means of the coil spring 84.

Figure 6:
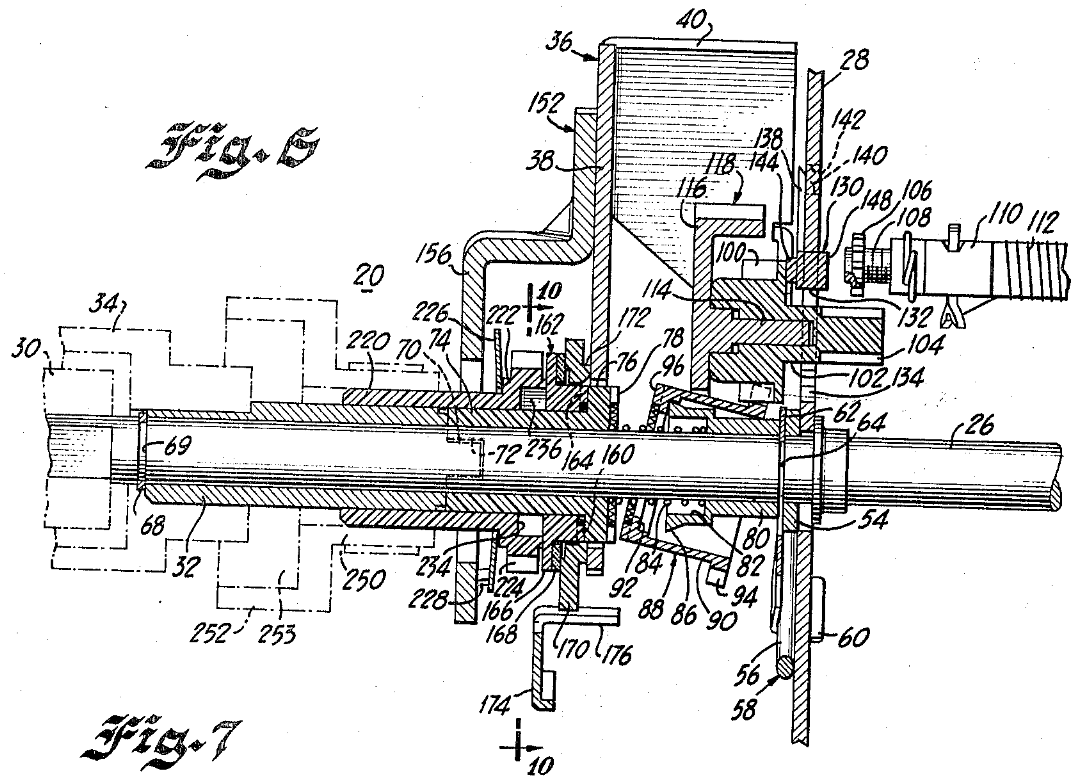
FIG. 6 is a sectional view taken along the line 6—6 of FIG. 4.
Figure 7:
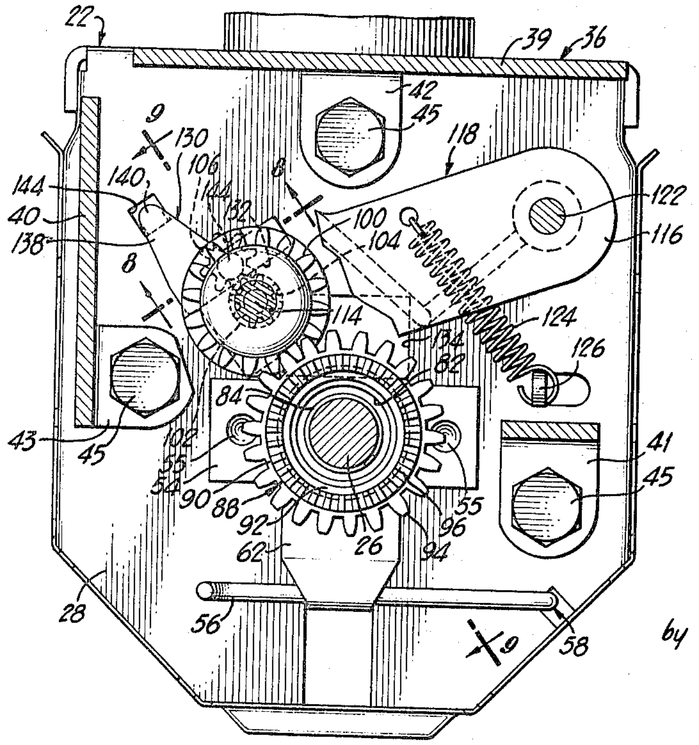
FIG. 7 is a sectional view similar to FIG. 4 but showing a different position of the fine tuning mechanism.

The forward end of the bearing sleeve 80 is flared outwardly so as to provide a sharp corner 86 which acts as a supporting fulcrum for a tiltable gearing assembly, indicated generally at 88. More particularly, the assembly 88 comprises a tubular sleeve 90 which loosely encircles the bearing sleeve 80 and is provided with a forward end flange 92 which defines a shoulder adapted to receive the fulcrum portion 86 of the bearing sleeve 80, as best illustrated in FIGS. 6 and 9 of the drawings. By positioning the shoulder 92 at one end of the assembly 88 this assembly is permitted to tilt about the corner 86 as a fulcrum when force is exerted on this assembly in a manner to be described in more detail hereinafter.

The rear end of the sleeve 90 is provided with an annular series of gear teeth 94, preferably formed integrally with the sleeve 90, which project radially outwardly from the periphery of the sleeve 90. The forward end of the sleeve 90 is formed with an annular series of relatively fine teeth 96 which project forwardly from the assembly 88 and are adapted to mesh with the teeth 78 on the driving member 74.

The gear teeth 94 on the assembly 88 are continuously in mesh with gear teeth 100 which are formed in an auxiliary shaft 102 on the inner end of which is formed a series of gear teeth 104 which are adapted to be moved into engagement with gear teeth 106 on a fine tuning adjusting element 108. The tuning element 108 is suitably mounted in the end bore of a tuning stick or panel 110 of the VHF tuner 22 and when the tuning element 108 is rotated, the inner end thereof moves within a tuning coil 112 wound around the exterior of the stick 110 so that the inductance of the coil 112 is modified slightly and a fine tuning adjustment of the tuner is provided, as will be readily understood by those skilled in the art. In this connection, it will be understood that the stick 110 is mounted in a suitable rotatable supporting structure which is secured to the channel selector shaft 26, this supporting structure normally being in the form of a turret provided with peripheral notches adapted to receive other sticks, similar to the stick 110, which are tuned to different television channels. As the station selector shaft 26 is rotated to the different television channel positions, a different one of the sticks 110 is brought into the operative position shown, for example, in FIG. 6 of the drawings, in which position the tuning element 108 is arranged to be driven by engagement of the gear teeth 104 and 106, as will be described in more detail hereinafter.

The auxiliary shaft 102 is rotatably mounted on a post 114 which is formed in the flat wall portion 116 of a pivotally mounted lever 118, this lever being provided with a bearing portion 120 which is pivotally mounted on a post 122 secured to the front wall 28 of the VHF tuner chassis 22 and projecting forwardly thereon. The lever 118 is biased by means of a coil spring 124, which is connected between the lever 118 and a flange 126 struck out of the front wall 28, so that the free end of the lever 118 is continuously urged toward the channel selector shaft 26. Accordingly, the biasing force of the spring 124 normally functions to tilt the gearing assembly 88 to the position shown in FIG. 6 since the gear teeth 100 engage the tips of the gear teeth 94 on the assembly 88 and exert a downward force on the rear end of the assembly 88 which causes this assembly to tilt about the fulcrum 86 to such a position that the rearward edge of the sleeve 90 strikes the outer surface of the bearing sleeve 80. In this position the auxiliary shaft 102 is positioned so that the gear teeth 104 thereof are positioned outside the path of movement of the gear teeth 106 of the tuning sticks 110. Accordingly, when the tuning mechanism 20 is in the position shown in FIG. 6 the channel selector shaft 26 may be rotated as desired so as to select a particular television channel and bring a particular one of the sticks 110 into the operative position shown in FIG. 6 and during this channel selecting operation the auxiliary shaft 102 does not interfere with such channel selection.

When it is desired to effect a fine tuning operation with respect to a selected VHF channel, the fine tuning shaft 32 is moved rearwardly along the station selector shaft 26 by the exertion of pressure on the fine tuning knob 34. When the shaft 32 is moved rearwardly the interconnected driving element 74 is also moved rearwardly and as this occurs the teeth 78 engage and mate with the teeth 96 on the tiltable gearing assembly 88. Since the assembly 88 is normally tilted, the teeth 78 will first engage the teeth 96 at a point below the channel selector shaft 26 with the result that a force is exerted on the forward bottom edge of the assembly 88 so that this assembly is moved about the fulcrum 86 to the position shown in FIG. 9, in which position the assembly 88 is substantially coaxial with the shaft 26, the teeth 78 and 96 are fully in mesh, and the auxiliary shaft 102 has been moved outwardly to such a position that the gear teeth 104 thereon are moved into engagement with the gear teeth 106 of the selected tuning stick 110. It will be noted that as this rearward movement of the shaft 32 occurs, the coil spring 84 is compressed and the bottom portion of the shoulder 92 on the gearing assembly 88 is moved into engagement with the end of the bearing sleeve 80 so that the assembly 88 is seated on the forward end of the bearing sleeve 80 and may be rotated about this outwardly flared end portion as a bearing surface.

If, now, the shaft 32 is rotated while rearward pressure is maintained on this shaft so as to hold the parts in the position shown in FIG. 9, the driving member 74 will rotate the gearing assembly 88 due to the full engagement of the teeth 78, 96, rotation of the gearing assembly 88 produces rotation of the auxiliary shaft 102 due to the engagement of the gear teeth 94 and 100, and rotation of the auxiliary shaft 102 produces a fine tuning adjustment of the tuning element 108 due to the engagement of the gear teeth 104 and 106. As this fine tuning adjustment of the element 108 is made the gear teeth 106 will remain in engagement with the gear teeth 104 although the position of the teeth 106 with respect to the gear teeth 104 will move as the tuning element 108 is adjusted. Accordingly, the gear teeth 104 are of sufficient width to permit a desired range of adjustments of the tuning element 108.

Figure 8:
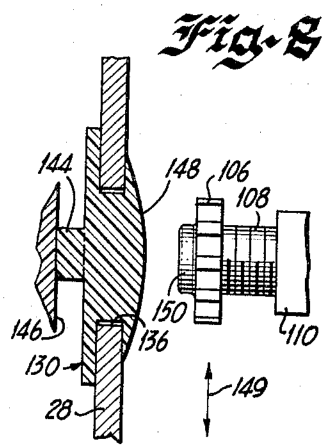
FIG. 8 is a sectional view taken along the line 8—8 of FIG. 7.

As stated heretofore, the tuning stick 110 is usually mounted in a pair of peripheral notches in spaced disks mounted on the station selector shaft 26 and if a radially outward force is exerted on the end of the tuning stick such force would tend to lift the stick out of its supporting disk which would then result in the stick being damaged as the station selector shaft is rotated. Accordingly, the outward movement of the free end of the lever 118 is limited so that the auxiliary shaft 102 and specifically the gear teeth 104 cannot exert a radially outwardly directed force on the end of the tuning stick 110. More particularly, a stop member indicated generally at 130 is mounted on the front wall 28 of the VHF tuner 22 in such manner that the auxiliary shaft 102 strikes the bottom edge 132 (FIG. 6) of the stop member 130 when rearward pressure is exerted on the tuning shaft 32 and the assembly 88 is moved to the position shown in FIG. 9. In order to mount the stop member 130 on the wall 28, the clearance opening 134 provided in the wall 28, through which the auxiliary shaft 102 extends, is provided with a notch portion 136 (FIG. 14) and the opposite edges of the stop member 130 are formed to provide grooves which fit over the edges of the notch 136, as best illustrated in FIG. 8. In order to retain the stop member 130 in place, this member is provided with an offset arm portion 138 which terminates in a hook portion 140. The arm 138 lies flat against the wall 28 and the hook portion 140 is adapted to snap into an opening 142 (FIG. 14) in the front wall 28 so that the stop member 130 may be readily snapped into place on the front wall 28.

In accordance with a further aspect of the invention, the stop member 130 performs several other functions in connection with the adjustment of the tuning mechanism 20. More particularly, the forward surface of the stop member 130 is provided with a forwardly projecting stud 144 (FIG. 14) which is adapted to act as a bearing surface against which the shoulder portion 146 of the auxiliary shaft 102 can ride as the shaft 102 is rotated. In this connection, it is noted that the spring 124 exerts a biasing force tending to hold the auxiliary shaft 102 on the post 114 and also biases the shoulder 146 against the stud 144 as the lever 118 is moved outwardly and the shaft 102 is rotated. By this means the auxiliary shaft 102, which is otherwise loosely positioned on the post 114, is accurately positioned with respect to the tuning stick 110 to be adjusted by a registration of the shoulder 146 with the stud 144 and by engagement of the auxiliary shaft 102 with the bottom edge 132 of the stop member 130.

The portion of the stop member 130 which extends inside the front wall 28 is provided with a curved surface 148 which is adapted to act as a stop for the forward end of the tuning element 108. Thus, the tuning element 108 is provided with a head portion 150 (FIG. 8) which will engage the surface 148 of the stop member 130 in the extreme outward position of the tuning element 108. In this connection it will be understood that a suitably resilient retaining means is provided in the tuning stick 110 so that when the tuning element 108 is moved into engagement with the surface 148 the tuning element 108 is not jammed but can jump threads so that further rotation of the auxiliary shaft 102 does not damage this element but merely holds it in its extreme outward position. The curved surface 148 also acts as a cam surface to move any one of the tuning elements 108 into its associated stick as the turret is rotated, in the event any stick is initially placed in the turret with the tuning element 108 thereof projecting out of the stick beyond the normal limit of travel thereof. Preferably, the stop member 130 is made of an acetal resin, nylon, cellulose acetate butyrate, or any other suitable material which will provide a low coefficient of friction bearing surface for the auxiliary shaft 102 and the tuning element 108.

It will be appreciated that the portion of the tuning mechanism 20 described thus far is employed to effect a VHF fine tuning operation when the control shaft 32 is pushed rearwardly to the position shown in FIG. 9 and then rotated. In the event that the VHF tuner 22 is used without the UHF tuner 24, this described portion of the tuning mechanism 20 is all that is required. However, in accordance with a further aspect of the invention, a VHF tuner equipped with such portion of the tuning mechanism 20 may be readily converted or adapted for UHF by simply mounting the main bracket 36 on the front wall 28 and adding the additional portions of the tuning mechanism 22 to be described hereinafter to effect a two-speed UHF tuning operation when the tuning shaft 32 is not pushed rearwardly, i.e., when this shaft is in the position shown in FIG. 6. When these additional portions of the tuning mechanism are mounted on the bracket 36 and the drive element 74, a retainer bracket 152 is mounted on the bracket 36 by means of the mounting bolt 154 and is provided with an offset portion 156 which functions to hold the assembled parts against the front wall 38 of the bracket 36. The bracket 152 is located by means of a lug portion 153 which extends into an opening 153a in the wall 38 of the bracket 36.

Figures 13, 15:
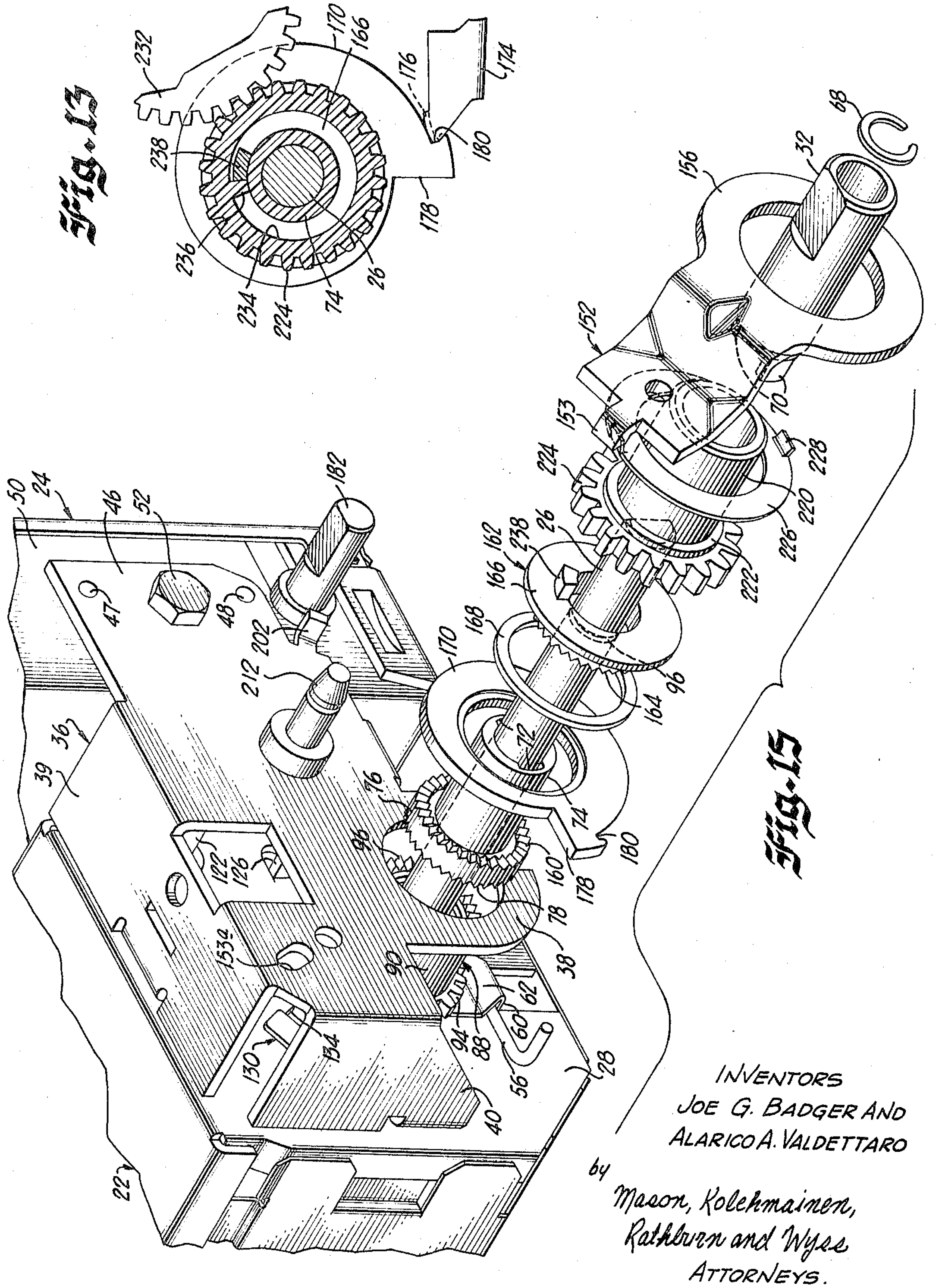
FIG. 13 is a sectional view similar to FIG. 10 and showing one end position of the fine tuning mechanism.
FIG. 15 is an exploded view of the part of the tuning mechanism extending beyond the main mounting bracket.

In order to employ the same control shaft for the two-speed UHF tuning operation, the drive element 74 is provided with an annular series of fine teeth 160 on the forward edge of the flange 76. A transfer disk 162, which is rotatably mounted on the drive element 74, is provided with an annular series of fine teeth 164 which are adapted to mate with the teeth 160 when the drive element 74 is in the forward position shown in FIG. 6. The transfer disk 162 is provided with a peripheral flange 166 against which is seated an annular gasket 168 which acts as a friction clutch member to transmit motion of the disk 162 to a cam member 170 which is also rotatably mounted on the transfer disk 162. The cam member 170 is provided with a rearwardly extending inner rim portion 172 which rides on the adjacent surface of the bracket wall 38 and the periphery of the cam member 170 is of a suitable spiral shape so as to convert rotary motion of the cam member 170 into pivotal motion of the cam follower arm 174 which is provided with a formed free end portion 176 which rides on the periphery of the cam member 170. The cam member 170 is provided with a radially extending edge portion 178 which functions as a stop to limit movement of the cam member 170 when the edge 178 is moved into engagement with the end portion 176 of the cam follower arm 174, as shown in FIG. 11. The spiral periphery of the cam 170 may also terminate in an outer shoulder portion 180 which acts as a stop to limit movement of the cam 170 in the opposite direction by engagement of the shoulder 180 with the right angle end portion 176, as shown in FIG. 13.

The cam follower arm 174 is pivotally mounted for rotation about the axis of the main tuning shaft 182 of the UHF tuner 24 and is connected to this main tuning shaft through a friction clutch mechanism so that as the cam follower 174 follows the peripheral contour of the cam 170 the main tuning shaft 182 is rotated at a slow rate of speed to provide a UHF fine tuning operation. More particularly, a hub member 184 is secured to the end of the main tuning shaft 182 by means of a set screw 186 and a UHF tuning gear 188 is secured against a shoulder 190 of the hub 184. The cam follower member 174 is connected to the gear 188 through a friction clutch disk 192 and the parts 174, 188, and 192 are held together by means of the spring 194 and retaining ring 195.

Figure 5:
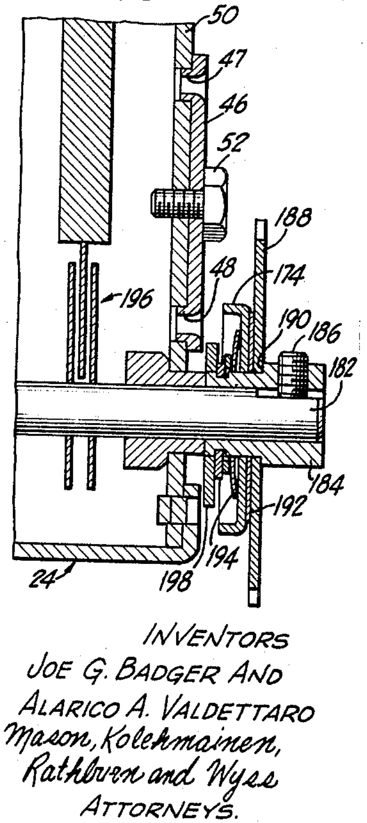
FIG. 5 is a sectional view taken along the line 5—5 of FIG. 1.

In order to limit movement of the main tuning shaft 182 to the range of movement of the electrical UHF tuning elements, indicated generally at 196 in FIG. 5, there is provided a stop disk 198 which is also secured to the bushing 184 and is provided with an arcuate portion defining the shoulders 200 which are adapted to engage a fixed lug 202 formed in the bottom edge of the front wall 38 of the main mounting bracket 36.

Figure 3:
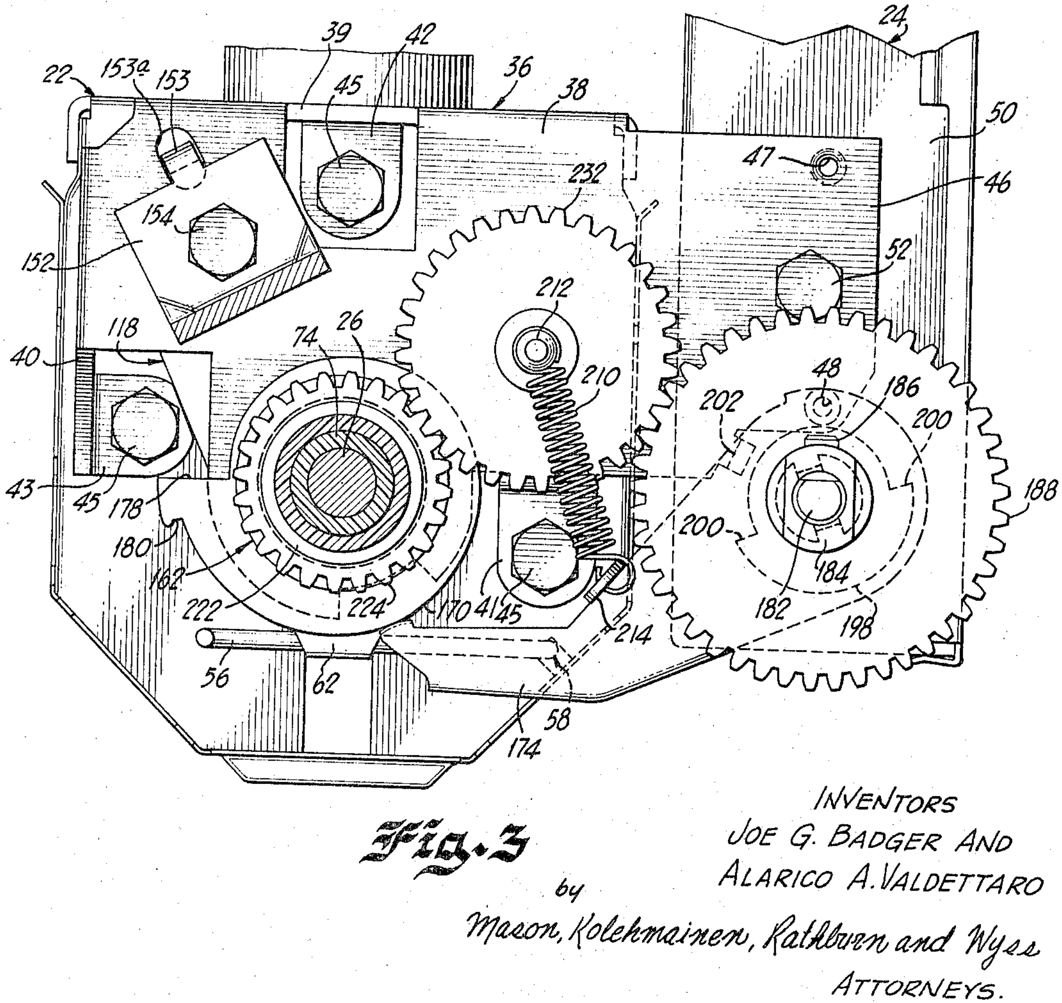
FIG. 3 is a sectional view taken along the line 3—3 of FIG. 2.
Figure 2:
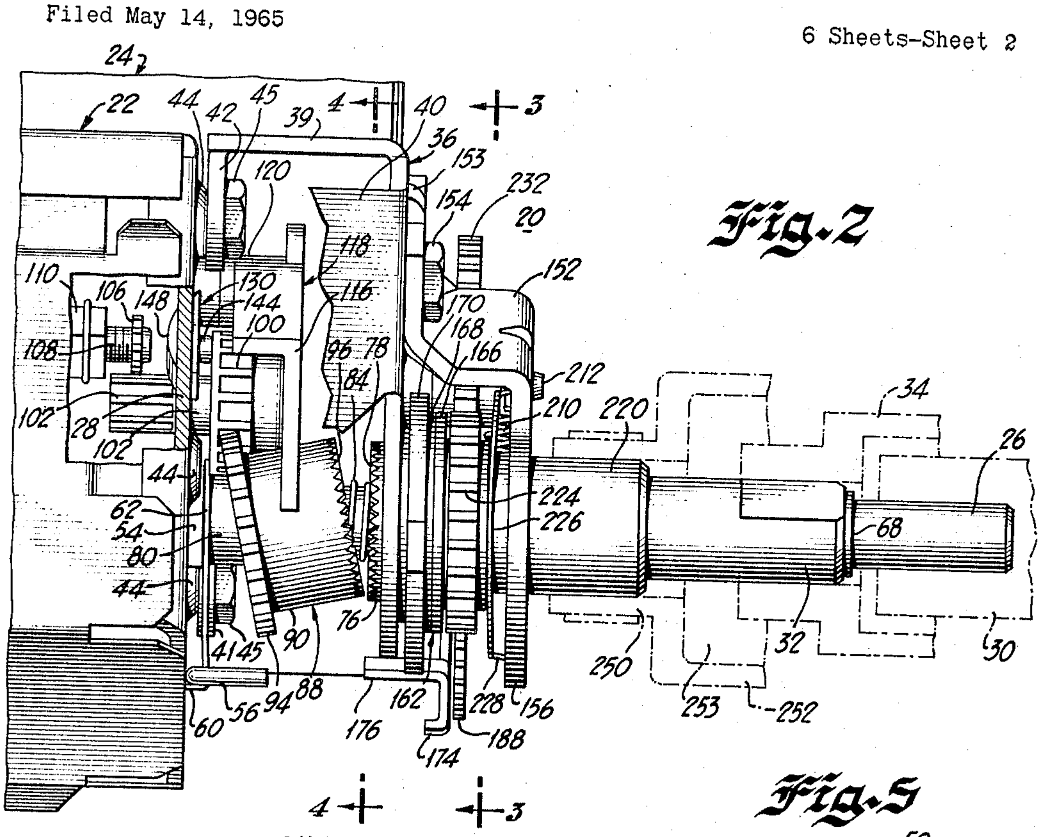
FIG. 2 is a side elevational view taken in the direction 2—2 of FIG. 1 on a somewhat larger scale and with portions of the mounting bracket broken away.
Figure 4:
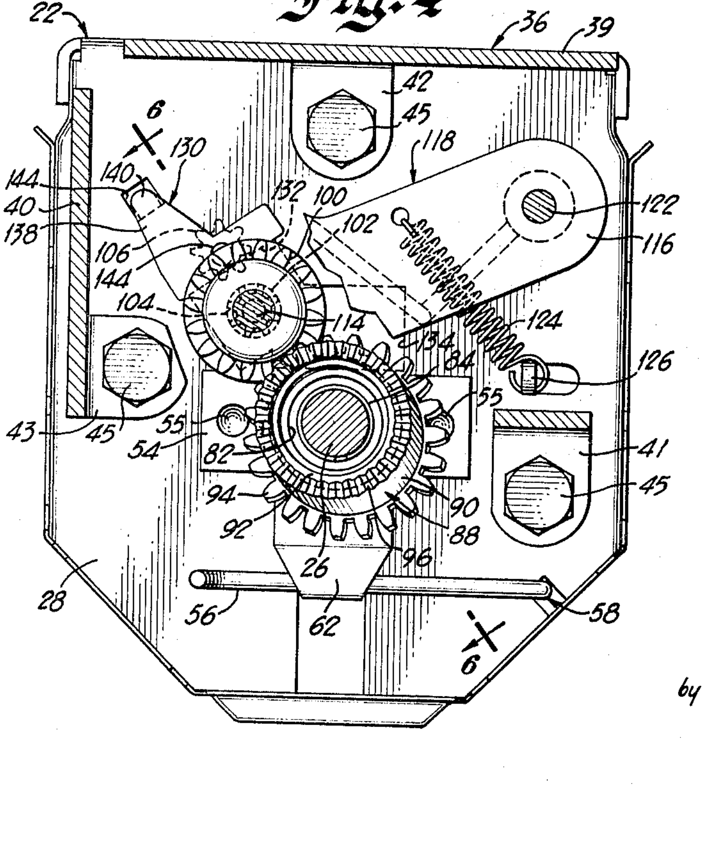
FIG. 4 is a sectional view taken along the lines 4—4 of FIG. 2.

When the control shaft 32 is in the forward position shown in FIG. 6 and this shaft is rotated to effect a UHF fine tuning operation, the drive element 74 functions to rotate the transfer disk 162 through the mating teeth 160 and 164 and rotation of the transfer disk 162 is effective through the friction clutch 168 member to rotate the cam 170. Rotation of the cam 170 functions to pivot the cam follower arm 174 since this arm is continuously urged into engagement with the peripheral edge of the cam 170 by means of a coil spring 210 which is connected between a post 212 mounted on the front wall 38 of the bracket 36 and an upturned lug portion 214 on one edge of the cam follower arm 174, as is best illustrated in FIG. 3. This pivotal movement of the cam follower arm 174 is transmitted through the clutch disk 192 to the gear 188 and the hub 184 so that the main tuning shaft 182 of the UHF tuner 24 is rotated slightly. Since the arm 174 is of considerable length the resultant movement of the UHF main tuning shaft 182 is at a relatively slow speed. Thus, when the cam 170 is moved from the position shown in full lines in FIG. 12 to the position shown in dotted lines in this figure, the cam follower arm 174 shifts its position only by an amount indicated in dotted lines in FIG. 12 with the resultant slight movement of the main tuning shaft 182. Accordingly, rotation of the control shaft 32 by manipulation of the knob 34 without rearward pressure on this knob, is effective to provide a slow speed UHF fine tuning adjustment within the UHF tuner 24.

In order to drive the main UHF tuning shaft 182 directly at a relatively high speed, a sleeve 220 is rotatably mounted on the control shaft 32 and the drive element 74, the sleeve 220 being provided with an annular shoulder 222 and peripheral gear teeth 224. The rearward end of the sleeve 220 bears on the forward face of the transfer disk 162 and a spring washer 226, which is provided with feet 228, is positioned between the shoulder portion 222 of the sleeve 220 and the rearward side of the flange portion 156 of the bracket 152. The washer 226 thus provides suitable pressure for holding the parts 222, 162, 168, and 170 in assembled relation against the front wall 38 of the main mounting bracket 36. The gear teeth 224 are in mesh with the gear teeth of an idler gear 232 which is rotatably mounted on the post 212 and the gear 232 is likewise in mesh with the teeth of the gear 188 secured to the main UHF tuning shaft 182 in the manner described heretofore.

In order to provide a lost motion connection between the transfer disk 162 and the UHF drive sleeve 220, so that the above-described UHF fine tuning operation may be performed before, or after, a direct high-speed UHF adjustment, the sleeve 220 is provided with a recess 234 in the rear end thereof and is also provided with an inwardly directed lug portion 236 (FIG. 10) which interrupts the recess 234. The transfer disk 162 is provided with a forwardly directed radial lug portion 238 which is adapted to fit into the recess 234 when the appropriate parts are assembled.

Figure 12:
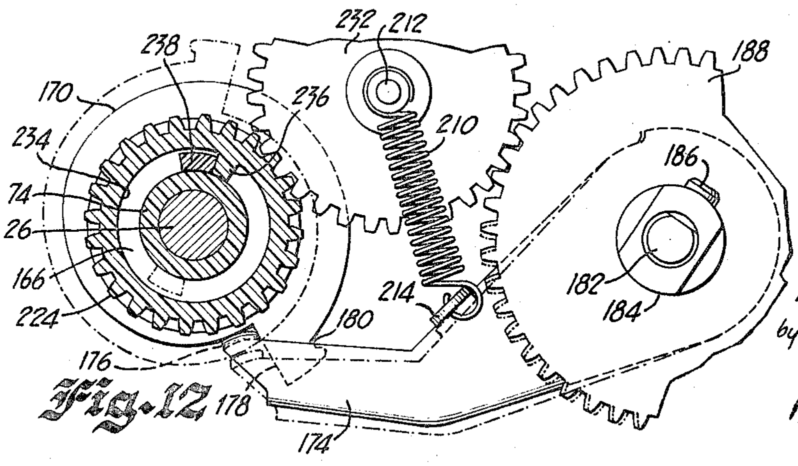
FIG. 12 is a somewhat more detailed sectional view similar to FIGS. 10 and 11 and illustrating the UHF fine tuning arrangement of the present invention.

When the shaft 32 is rotated while in the outermost position shown in FIG. 6, the transfer disk is also rotated in the manner described above to effect rotation of the cam 170 and a fine tuning UHF operation as described in detail heretofore. It will be evident from FIG. 10 that the transfer disk 162 can be rotated nearly 360° before the lug 238 engages the inwardly projecting lug 236 on the sleeve 220. Accordingly, the UHF fine tuning operation may continue for almost 360° rotation. The cam 170 can only be rotated until the end portion 176 of the follower arm 174 strikes either the stop surface 178 or the shoulder 180 after which the cam 170 is prevented from moving. However, continued rotation of the transfer disk 162 causes the friction disk 168 to slip so that the lug 238 may be moved into engagement with either one side or the other of the inturned lug 236 on the sleeve 220 and upon further continued rotation of the transfer disk 162 in the same direction the gear 224 is rotated and produces direct high speed rotation of the gear 188 through the idler gear 232. Thus, when the follower arm 174 is in engagement with the stop surface 178, as shown in FIG. 11, the cam 170 is prevented from further rotation but the transfer disk may continue to be rotated in the clockwise direction as viewed in FIG. 11 until it picks up the lug 236 and thereby causes rotation of the main UHF tuning shaft 182 at the higher speed. This high speed movement of the tuning shaft 182 is employed to turn the shaft to a point slightly beyond the desired UHF station after which the control shaft 32 is rotated in a counterclockwise direction. Such movement is indicated in FIG. 12 by a shift in position of the lug 238 from the position shown in full lines in FIG. 12 to the position shown in dotted lines therein and during this counterclockwise movement of the shaft 32 the follower arm 174 causes the UHF shaft 182 to move through the area of the desired UHF station, as indicated by the dotted line position in FIG. 12.

In order to indicate the position of the UHF tuning shaft 182 and to provide such an indication which will respond to both the above-described UHF fine tuning operation as well as the high-speed direct UHF tuning operation, there is provided an indicator sleeve 250 (FIG. 1) which is arranged to be press fitted onto the end of the sleeve 220. The indicator sleeve 250 is provided with a portion 252 of enlarged diameter which provides a recess 253 into which the rear end of the tuning knob 34 may extend when this knob is pushed rearwardly to effect the above-described VHF fine tuning operation. The sleeve 250 is also provided with an outwardly extending flange portion 254 on which suitable indicia corresponding to the UHF stations distributed through the UHF band may be imprinted. A suitable viewing arrangement (not shown) may be employed to view the UHF station indicia, as will be readily understood by those skilled in the art.

When the knob 34 is rotated while in its outermost position to effect the above-described UHF fine tuning operation, the lug 238 on the transfer disk 162 is not in engagement with the lug 236 and, hence, does not produce direct movement of the sleeve 220 or the indicator 250 attached thereto. However, movement of the transfer disk 162 is effective to rotate the cam 170 which in turn causes pivotal movement of the cam follower arm 174 and a slow-speed adjustment of the main tuning shaft 182 in the manner described in detail heretofore. Such slow-speed movement of the shaft 182 is effective to rotate the sleeve 220 and the indicator 250 since the gears, 188, 232, and 224 remain in mesh so that the indicator sleeve 250 is moved slightly in accordance with the fine tuning adjustment of the shaft 182 and will thus indicate when the particular UHF station which is being fine tuned for best reception has been selected.

When the main tuning shaft 182 reaches either extreme limit of travel, one of the shoulders 200 engages the stop 202 and prevents further movement of this shaft. In order that continued rotation of the knob 34 will not damage the tuning mechanism 20 or the mechanism associated with the main UHF tuning shaft 182, in the arrangement of the present invention the coil spring 84, which biases the mating teeth 160 and 162 into engagement when the control shaft 32 is in the outermost position shown in FIG. 6, permits the teeth 160 and 164 to slip over one another when the main tuning shaft 182 reaches either of the above-described limits of travel. Accordingly, further rotation of the main tuning shaft 182 through the gears 188, 232, and 224 is terminated and damage to the UHF tuner 24 is avoided. At the same time, the clicking noise produced when the gear teeth 160 ride over the gear teeth 164, informs the operator that the extreme limit of the UHF band has been reached and that he should reverse the direction of rotation of the shaft 21.

While the tuning mechanism of the present invention has been illustrated in conjunction with a turret type VHF tuner wherein the tuning sticks 110 are employed, it will be understood that a similar tuning mechanism may be employed with a switch type tuner in which a single fine tuning impedance is, in many instances, employed for all VHF stations. Furthermore, such a common fine tuning arrangement may be utilized while providing memory tuning for the individual VHF channel as in the above-described turret tuner embodiment. Thus, a memory fine tuning arrangement such as is disclosed in an application of Joe G. Badger, Ser. No. 121,210, filed June 30, 1961 now Patent No. 3,218,588, may be employed wherein a support structure which is carried by the VHF station selector shaft is provided with a plurality of individually adjustable gear elements and a linkage is provided so that a common fine tuning impedance is adjusted in accordance with the position of each individual element when the corresponding station is selected by movement of the station selector shaft.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a television tuner, the combination of, a station selector shaft rotatable to a plurality of station selecting positions, a support structure rotatable with said selector shaft and carrying a plurality of individually adjustable gear elements for fine tuning adjustment to different television stations, fine tuning means concentric with said selector shaft and including an annular series of fine teeth, said adjustable gear elements moving in a predetermined path around said selector shaft as said support structure is rotated, a movable member, an auxiliary shaft journalled for rotation in said movable member and bodily movable therewith, first gear means on said auxiliary shaft and positioned inside said predetermined path of said adjustable gear elements, a second gear on said auxiliary shaft, a hollow sleeve loosely encircling said selector shaft, means defining a fulcrum positioned along said selector shaft and adapted to engage the inner surface of said sleeve adjacent one end thereof, means defining a series of gear teeth around the periphery of said sleeve adjacent the other end thereof and adapted to engage the teeth of said second gear on said auxiliary shaft, means defining teeth on said one end of said sleeve adapted to engage said series of teeth on said fine tuning means, said sleeve being normally tilted at an angle with respect to said selector shaft in which position said first gear means is positioned inside said predetermined path and responding to inward movement of said fine tuning means by pivoting about said fulcrum means so that said auxiliary shaft is moved outwardly and said first gear means is moved into engagement with a selected one of said gear elements, said sleeve and said first and second gears being responsive to rotation of said fine tuning means after said inward movement thereof for adjusting said selected gear element.

2. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, a control sleeve loosely encircling said selector shaft, means defining a fulcrum spaced along the length of said selector shaft and engaging the inner surface of said sleeve, said sleeve being normally tilted so that the axis thereof is at an angle with respect to said selector shaft, means responsive to inward movement of said control member for pivoting said sleeve about said fulcrum means to an adjusting position in which the axis of said sleeve is substantially parallel to said selector shaft, cooperating means on said control member and said sleeve for rotating said sleeve while the same is maintained in said adjusting position, and means driven by said sleeve and movable into said path when said sleeve is moved to said adjusting position for rotating a selected one of said gear elements.

3. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, a control sleeve loosely encircling said selector shaft, means defining a fulcrum spaced along the length of said selector shaft and engaging the inner surface of said sleeve, said sleeve being normally tilted so that the axis thereof is at an angle with respect to said selector shaft, means responsive to inward movement of said control member for pivoting said sleeve about said fulcrum means to an adjusting position in which the axis of said sleeve is substantially parallel to said selector shaft, cooperating means on said control member and said sleeve for rotating said sleeve while the same is maintained in said adjusting position, means driven by said sleeve and movable into said path when said sleeve is moved to said adjusting position for rotating a selected one of said gear elements, and means for biasing said last named means outside said predetermined path when said sleeve is tilted.

4. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, a control sleeve loosely encircling said selector shaft, means defining a fulcrum spaced along the length of said selector shaft and engaging the inner surface of said sleeve, said sleeve being normally tilted so that the axis thereof is at an angle with respect to said selector shaft, means responsive to inward movement of said control member for pivoting said sleeve about said fulcrum means to an adjusting position in which the axis of said sleeve is substantially parallel to said selector shaft, an auxiliary shaft having first gear means mounted thereon, means normally positioning said first gear means outside said predetermined path of said adjustable gear elements, means responsive to pivoting movement of said sleeve about said fulcrum means for moving said shaft so that said first gear means engages a selected one of said gear elements, and means including cooperating means on said sleeve and said control member for rotating said first gear means while in engagement with said selected gear element in response to rotation of said control member.

5. In a television tuner, the combination of, a station selector shaft rotatable to a plurality of station selecting positions, a support structure rotatable with said selector shaft and carrying a plurality of individually adjustable gear elements for fine tuning adjustment to different television stations, asid adjustable gear elements moving in a predetermined path around said selector shaft as said support structure is rotated, a fine tuning control member rotatably mounted on said selector shaft and slidable therealong, a control sleeve loosely encircling said selector shaft, means defining a fulcrum spaced along the length of said selector shaft and engaging the inner surface of said sleeve, said sleeve being normally tilted so that the axis thereof is at an angle with respect to said selector shaft, means responsive to inward movement of said control member for pivoting said sleeve about said fulcrum means to an adjusting position in which the axis of said sleeve is substantially parallel to said selector shaft, a movable member, an auxiliary shaft carried by said movable member and having first gear means mounted thereon, means normally positioning said movable member so that said first gear means is removed from said predetermined path of said adjustable gear elements, means responsive to pivoting movement of said sleeve about said fulcrum means for moving said movable member to a position such that said first gear means engages a selected one of said gear elements, and means including cooperating means on said sleeve and said control member for rotating said first gear means while in engagement with said selected gear element in response to rotation of said control member.

6. In a television tuner, the combination of, a station selector shaft rotatable to a plurality of station selecting positions, a suppodt structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, a control sleeve loosely encircling said selector shaft, means defining a fulcrum spaced along the length of said selector shaft and engaging the inner surface of said sleeve, said sleeve being normally tilted so that the axis thereof is at an angle with respect to said selector shaft, means responsive to inward movement of said control member for pivoting said sleeve about said fulcrum means to an adjusting position in which the axis of said sleeve is substantially parallel to said selector shaft, a movable member, an auxiliary shaft carried by said movable member and having first gear means mounted thereon, means normally positioning said movable member so that said first gear means is removed from said predetermined path of said adjustable gear elements, means responsive to pivoting movement of said sleeve about said fulcrum means for moving said movable member to a position such that said first gear means engages a selected one of said gear elements, second gear means on one end of said sleeve, third gear means on said auxiliary shaft and in mesh with said second gear means, and means including cooperating means on said sleeve and said control member and said second and third gear means for rotating said first gear means while in engagement with said selected gear element in response to rotation of said control member.

7. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, said control member being normally biased to a forward position along said shaft but movable to a rearward position in response to pressure exerted thereon, a control sleeve loosely encircling said selector shaft, cooperating toothed means on said control member and said control sleeve for rotating said sleeve from said control member and adapted to be fully meshed when said control member is in said rearward position, means driven by said sleeve for rotating a selected one of said adjustable gear elements, means defining a fulcrum spaced along said selector shaft and engaging the inner surface of said sleeve, and means normally biasing said driven means out of said predetermined path of said adjustable gear elements, said last named means acting to tilt said control sleeve so that said cooperating toothed means are out of mesh.

8. In a television tuner, the combination claimed in claim 7 wherein said cooperating toothed means comprises a first annular series of teeth on one end of said control member and a second series of mating teeth on the end of said sleeve adjacent said control member.

9. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, said control member being normally biased to a forward position along said shaft but movable to a rearward position in response to pressure exerted thereon, a control sleeve loosely encircling said selector shaft, cooperating toothed means on said control member and said control sleeve for rotating said sleeve from said control member and adapted to be fully meshed when said control member is in said rearward position, an auxiliary shaft having first gear means thereon, means responsive to movement of said control member to said rearward position for moving said first gear means into engagement with a selected one of said adjustable gear elements and rotating the same in response to rotation of said sleeve, means defining a fulcrum spaced along said shaft and engaging the inner surface of said sleeve, and means normally biasing said auxiliary shaft to a position such that said first gear means is out of said predetermined path of said gear elements, said last named means acting to tilt said control sleeve about said fulcrum means when said auxiliary shaft is biased to said position.

10. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, said control member being normally biased to a forward position along said shaft but movable to a rearward position in response to pressure exerted thereon, a control sleeve loosely encircling said selector shaft, cooperating toothed means on said control member and said control sleeve for rotating said sleeve from said control member and adapted to be fully meshed when said control member is in said rearward position, an auxiliary shaft having first gear means thereon, second gear means on said sleeve, third gear means on said auxiliary shaft and in mesh with said second gear means, means defining a fulcrum spaced along said shaft and engaging the inner surface of said sleeve, and means normally biasing said auxiliary shaft to a position such that said first gear means is out of said predetermined path of said gear elements, said last named means acting to tilt said control sleeve about said fulcrum means when said auxiliary shaft is biased to said position while said second and third gear means remain in mesh.

11. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a fine tuning control member rotatably mounted on said selector shaft and slidable therealong, said control member being normally biased to a forward position along said shaft but movable to a rearward position in response to pressure exerted thereon, a control sleeve loosely encircling said selector shaft, cooperating toothed means on said control member and said control sleeve for rotating said sleeve from said control member and adapted to be fully meshed when said control member is in said rearward position, a pivotally mounted member, an auxiliary shaft journalled for rotation on said pivotally mounted member and having first gear means thereon, means responsive to movement of said control member to said rearward position for moving said pivotally mounted member to a position such that said first gear means engages a selected one of said adjustable gear elements, means defining a fulcrum spaced along said selector shaft and engaging the inner surface of said sleeve, and means normally biasing said pivotally mounted member to an inactive position in which said first gear means is removed from said predetermined path of said adjustable gear elements, said last named means acting to tilt said control sleeve about said fulcrum means when said pivotally mounted member is biased to said inactive position.

12. In a television tuner, the combination claimed in claim 11 wherein said fulcrum means comprises a tubular member positioned on said selector shaft and provided with an outwardly extending flange along the length thereof which engages the inner surface of said sleeve.

13. In a television tuner, the combination claimed in claim 11 wherein said sleeve is provided with means defining an internal shoulder adjacent one end thereof and said fulcrum means comprises a tubular member slidably mounted on said selector shaft and provided with an outwardly extending flange which is seated against said shoulder when said control member is in said rearward position.

14. In a television tuner, the combination claimed in claim 11 wherein said sleeve is provided with means defining an internal shoulder adjacent one end thereof and said fulcrum means comprises a tubular member slidably mounted on said selector shaft and provided with an outwardly extending flange which is seated against said shoulder when said control member is in said rearward position, only the upper portion of said flange remaining in engagement with said shoulder when said pivotally mounted member is in said inactive position and said sleeve is tilted.

15. In a television tuner, the combination claimed in claim 10 wherein said fulcrum means comprises a tubular member positioned on said selector shaft and provided with an outwardly extending flange which engages the inner surface of said sleeve, said flange acting to center said loosely mounted sleeve so that said cooperating toothed means are held in approximate registry despite said tilting of said sleeve.

16. A combined VHF–UHF television tuner, comprising a VHF station selector shaft, a support structure rotatable with said VHF station selector shaft and carrying a plurality of individually adjustable gear elements for fine tuning adjustment to different VHF television stations, said gear elements moving in a predetermined path as said support structure is rotated, a multi-purpose control shaft rotatably mounted on said selector shaft and slidable therealong, said control shaft being normally biased to a forward position along said selector shaft but movable to a rearward position in response to pressure exerted thereon, a UHF main tuning shaft, a cam member rotatably mounted on said control shaft, clutch means connecting said control shaft to said cam member to rotate the same when said control shaft is in said forward position, means responsive to rotation of said cam member for rotating said main tuning shaft at a relatively slow rate, stop means for limiting rotation of said cam member to less than 360°, means responsive to continued rotation of said control shaft after said stop is reached for driving said main tuning shaft directly at a substantially increased rate, a control sleeve loosely encircling said selector shaft, cooperating toothed means on said control shaft and said sleeve, means responsive to rearward pressure on said control shaft for disengaging the same from said main tuning shaft and engaging said cooperating toothed means, means driven by said sleeve for rotating a selected one of said adjustable gear elements, means defining a fulcrum spaced along said selector shaft and engaging the inner surface of said sleeve, and means normally biasing said driven means out of said predetermined path of said gear elements, said last named means acting to tilt said control sleeve about said fulcrum means when said control shaft is in said forward position.

17. A combined VHF–UHF tuner as claimed in claim 16 wherein there is provided an intermediate control member rotatably mounted on said control shaft, said intermediate control member having said cooperating toothed means on one end surface thereof and rotatably supporting said cam member.

18. In a television tuner, the combination of, a station selector shaft rotatable to a plurality of station selecting positions, a support structure rotatable with said selector shaft and carrying a plurality of individually adjustable gear elements for fine tuning adjustment to different television stations, said adjustable gear elements moving in a predetermined path around said selector shaft as said support structure is rotated, a rotatable fine tuning control member, a control sleeve, means defining a fulcrum engaging the inner surface of said sleeve, said sleeve being normally tilted so that the axis thereof is at an angle with respect to the axis of said fine tuning control member, means responsive to inward movement of said control member for pivoting said sleeve about said fulcrum means to an adjusting position in which the axis of said sleeve is aligned with the axis of said fine tuning control member, cooperating means on said control member and said sleeve for rotating said sleeve while the same is maintained in said adjusting position, and means driven by said sleeve and movable into said path when said sleeve is moved to said adjusting position for rotating a selected one of said gear elements.

References Cited by the Examiner

UNITED STATES PATENTS

| | | | |
|---|---|---|---|
| 3,183,726 | 5/1965 | Badger | 74—10.8 |
| 3,251,234 | 5/1966 | Valdettaro | 74—10.8 |

MILTON KAUFMAN, *Primary Examiner.*